Jan. 20, 1953          G. L. GUSTAFSON          2,626,125
PULL-UP HITCH FOR TRACTORS
Filed Jan. 5, 1949
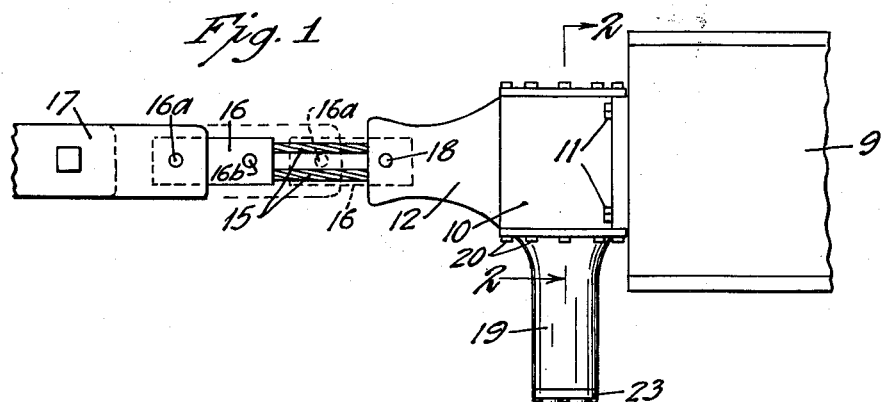
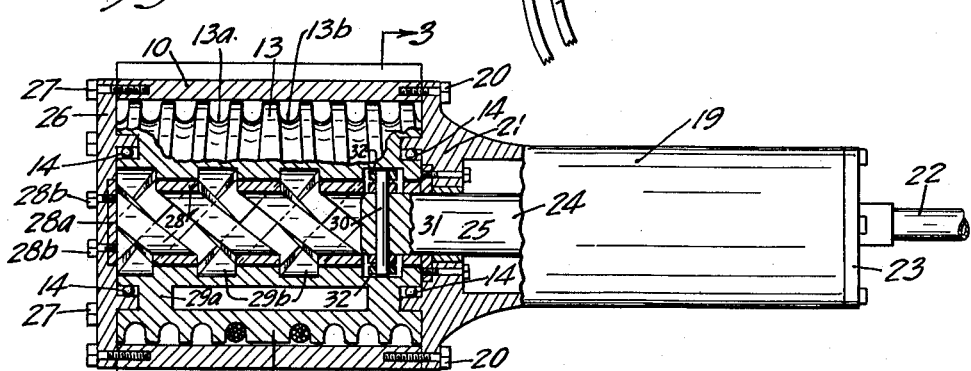
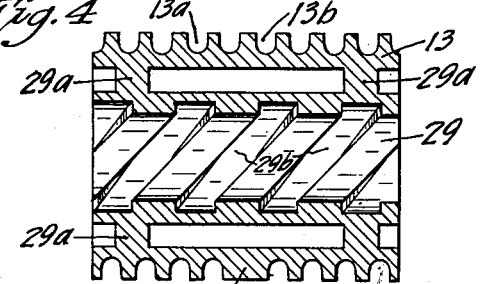
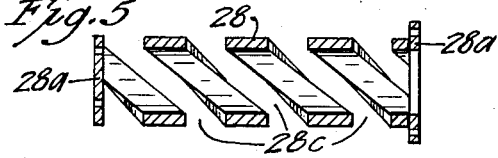
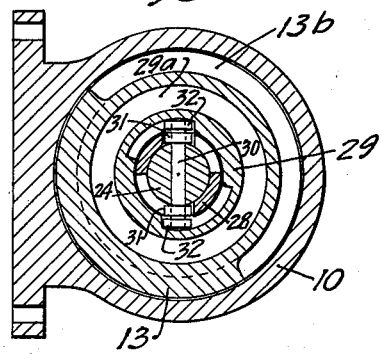
INVENTOR.
George L. Gustafson
BY
Williamson & Williamson
ATTORNEYS Patented Jan. 20, 1953

2,626,125

UNITED STATES PATENT OFFICE 2,626,125

PULL-UP HITCH FOR TRACTORS

George L. Gustafson, Minneapolis, Minn.

Application January 5, 1949, Serial No. 69,272

4 Claims. (Cl. 254—186)

This invention relates to tractor hitches and particularly to a pull-up type of hitch.

It has long been a problem when connecting a tractor to a trailing unit to be drawn, to align the hitching elements of the drawbar and the tractor to form a positive connection therebetween. With most conventional hitches the tractor must be backed up to exactly the right position and thereafter the drawbar lifted manually and the two hitching elements perfectly aligned to make the connection.

It is an object of my invention to provide a novel and improved tractor hitch adapted to be connected to the drawbar of a trailing unit even when said trailing unit and drawbar are disposed a substantial distance behind the tractor, and after connection therewith to pull the trailing unit up to the tractor to permit a positive connection to be made between the tractor and the drawbar.

It is another object to provide a pull-up type of tractor hitch having a flexible cable wound on a winding drum and adapted to be pulled out to permit attachment of the free end of said cable with the drawbar of a trailing unit disposed in spaced relation to said tractor and having a mechanism for thereafter rotating said drum to wind up said capable thereon and pull the trailing unit up to said tractor to permit a positive connection to be made between the drawbar and the tractor.

It is a further object to provide a pull-up type of tractor hitch having a cable and drum winding mechanism and incorporating a hydraulic plunger system therewith with an ingenious mechanism for converting the short rectilinear stroke of the plunger to rotary movement for driving the winding drum and also building up the speed of rotation of the drum to permit a relatively large amount of take-up for a slight projection of said plunger.

More specifically, it is an object to provide a cable and drum winding mechanism including a hydraulically actuated plunger for actuating a pull-up type of tractor hitch and incorporating therewith a series of interrelated spirals associated with said plunger and said drum to convert the short rectilinear stroke of the plunger to a relatively large amount of take-up in the cable to produce a highly efficient take-up hitch mechanism.

These and other objects and advantages of my invention will more fully appear from the following description made in connection with the accompanying drawings wherein like reference characters refer to similar parts throughout the several views and in which:

Fig. 1 is a top plan view of my pull-up hitch as attached to the back of a tractor and showing a portion of a drawbar of a trailing unit about to be pulled up to the tractor and showing said drawbar in positively attached position by dotted lines after being pulled up;

Fig. 2 is a fragmentary vertical sectional view taken substantially along the line 2—2 of Fig. 1 showing in detail the plunger and spiral driving mechanism for the winding drum and showing the hydraulic ram housing in side elevation;

Fig. 3 is a transverse vertical sectional view taken substantially along the line 3—3 of Fig. 2;

Fig. 4 is a vertical sectional view of the winding drum and internal rotating spiral fixed thereto with the stationary spiral and plunger removed;

Fig. 5 is a longitudinal vertical sectional view of only the stationary spiral; and Fig. 6 is a fragmentary side elevational view of the outer end portion of the plunger.

Only the rear end of a conventional tractor is shown in Fig. 1 and is designated by the numeral 9. A winding drum housing 10 is shown securely attached to the rear end 9 of said tractor as by the bolts 11. A bell-shaped fair-leader 12 is in the form shown integrally cast on the drum housing 10 and extends rearwardly therefrom. A winding drum 13 having in the form illustrated two sets of cable-receiving grooves 13a and 13b respectively, is journaled in the housing 10 on suitable bearings such as the ball-bearings 14, the details of which will be described later. A pair of cables 15 are respectively wound in the grooves 13a and 13b on the drum 13 and extend outwardly through the fair-leader 12 and have a connection link 16 fixed at the outer ends thereof. The connection link 16, as shown in Fig. 1, is adapted to be connected at its outer end to a drawbar 17, only a fragmentary portion of which is shown in Fig. 1. The link 16 has a pair of longitudinally spaced apertures 16a and 16b formed therethrough, aperture 16a being adapted to receive a pin extending through the forward portion of the drawbar 17 to positively connect said drawbar 17 to the link 16. The rear portion of the fair-leader has a pair of vertically aligned apertures 18 formed therethrough to form a hitching bracket, and a pin is adapted to be inserted through apertures 18 and aperture 16b when aligned therewith to positively connect link 16 with the rear extremity 9 of the tractor.

A ram housing 19 is fixed on one end of the drum housing 10 as by the cap screws 20 and has an annular bearing support 21 integrally fixed on the inner end thereof. A conventional hydraulic ram (not shown) is mounted within the housing 19 and is connected by the fluid supply lines 22 with a source of fluid under pressure, such as the conventional hydraulic pump (not shown) mounted on the tractor. The outer end of the housing 19 is closed around a fluid inlet and outlet as by the closure cap 23. A plunger 24 is fixed in direct end to end alignment with the ram and extends through the annular bearing support 21 and is journaled in a suitable bearing 25 mounted in said support 21. The housing 10 is closed at its other end as by the cover plate 26 securely held in place by the cap screws 27.

A fixed spiral 28 has its end extremities respectively fixed to bearing support 21 and cover plate 26, as by a pair of attachment plates 28a, each of which is held to its respective support by a plurality of cap screws 28b. The plates 28a may be square in shape and be respectively received in cooperating square recesses formed in the plates 21 and 26 to positively prevent rotation thereof and remove the torque strain from the cap screws 28b. The cover plate 26 and bearing support 21 respectively carry the two bearing units 14 on which the rotating winding drum 13 is journaled. A rotating spiral 29 of opposite pitch from stationary spiral 28 is fixed to the inner periphery of the winding drum 13 as by a pair of transversely disposed annular webs 29a and surrounds the stationary spiral 28.

The end portion of the plunger 24 extends into the spiral 28 and has a transversely disposed pin 30 fixed therein and extending laterally outwardly therebeyond on both sides thereof. A pair of rollers 31 are respectively journaled on the end portions of pin 30 and are disposed adjacent plunger 24 for engagement in the groove 28c of spiral 28, the pitch of said groove in the form shown being at least 45° to permit rollers on both ends to be received therein. A second pair of rollers 32 are journaled respectively on the extreme outer end portions of said pin 30 and are adapted to be received in the groove 29b of the rotating spiral 29 which has a pitch substantially equal to the pitch of the groove 28c and sloping in the opposite direction.

*Operation*

When the drawbar of a wagon or other trailing unit such as a farm implement is to be connected to a tractor, it is a difficult and tedious job to make this connection, often causing injury to the operator. With my improved pull-up hitch, this connection can be easily made by merely unwinding the cables 15 from the drum 13 and attaching the outer end of link 16a to the forward end of the drawbar 17. After this connection has been made, the hydraulic pump of the tractor is controllably operated to actuate the hydraulic ram in casing 19 and forcibly project the plunger 24 into the stationary spiral 28. The rollers 31 engaged in the groove 28c of stationary spiral 28 travel around in said groove and cause said plunger 24 to rotate in a clockwise direction, as viewed in Fig. 3. This clockwise rotation of plunger 24 causes a similar clockwise rotation of rotating spiral 29 at approximately twice the velocity of rotation of said plunger. The rollers 32 engage the spiral 29 in the groove 29b thereof and cause this accelerated rotation of the spiral 29. The rotating spiral 29 is fixed to drum 13 and rotates said drum to wind the two cables 15 thereon respectively in the grooves 13a and 13b. When the plunger reaches the end cover 26, the link 16 will be drawn into the fair-leader 12 and disposed in position therein so that the aperture 16b can be readily aligned with apertures 18 to permit a connection pin to be dropped therethrough to form a positive connection between the drawbar and the tractor. The fair-leader 12 flares outwardly at the inner portion thereof as well as the outer portion. The flaring at the outer portion serves to guide the cables and link into hitching position, and the flaring on the inner portion serves to guide the cables 15 onto their respective grooves 13a and 13b.

It will be seen that I have provided a novel and improved pull-up type tractor hitch which is adapted to pull the drawbar of a trailing unit up into close association with the tractor and facilitate making a positive connection between said drawbar and the tractor, the outer link member of the pull-up mechanism forming a cooperating part in the positive connection ultimately made. Also, it should be noted that the two interrelated spirals of the drum-rotating mechanism provide a particularly ingenious and highly efficient transmission mechanism for obtaining the desired relatively fast rotation of the drum 13 to produce a relatively large amount of take-up for a short operating stroke of the plunger. This conversion of a small rectilinear movement to a relatively large rotational movement and large take-up of the flexible cable is an extremely important part of my invention and permits a trailing unit which is disposed in an inaccessible position in spaced relation to a tractor to be drawn up to the tractor and a positive hitching connection easily made therebetween. It is also important to note that if a tractor with a heavy load attached is stuck on a slippery surface, the forward hitching pin may be removed and the tractor pulled forwardly onto solid ground to unwind the cable and the trailing unit subsequently pulled up thereto by my take-up mechanism, and if necessary, the operation repeated until sufficient traction is obtained to permit normal towing procedure.

It should also be noted that the drawbar with an extremely heavy load thereon may be eased downwardly by releasing only the forward pin connection of the link 16 and the hydraulic pressure against the ram mechanism controlled to slowly lower said drawbar to the ground and prevent damage to the drawbar which might be caused by forcible impact against the ground.

It will, of course, be understood that various changes may be made in the form, details, arrangement and proportions of the parts without departing from the scope of my invention.

1. For use with a pull-up type trailer hitch, a hollow rotary drum adapted to receive an elongated flexible take-up member thereon, means for journaling said drum, a longitudinally shiftable power driven element, a transmission mechanism including a spiral fixed to said drum journalling means and having at least a portion thereof disposed concentrically of said power driven element, a second spiral having its pitch sloped oppositely of the pitch of the first spiral and having at least a portion thereof concentrically disposed relative said first spiral, and a connection between said driven element, said first spiral and said second spiral, said second spiral being fixed to the winding drum to rotate the same when power is applied to said longitudinally projectible power driven element, whereby rectilinear motion will be converted to rotary motion.

2. For use with a trailer hitch of the pull-up type, a supporting structure, a hollow rotary drum journaled on said structure and adapted to have an elongated flexible take-up member secured at one end thereto, a longitudinally shiftable power driven element, a transmission mechanism including a spiral forming a driving connection with said winding drum and a second spiral secured in fixed relation to said supporting structure and having its pitch sloped oppositely to the pitch of said first spiral and disposed concentrically thereof, said power driven longitudinally shiftable element being projectible concentrically into said two spirals, and an outstanding element connected to said projectible element for simultaneous sliding engagement in said two spirals.

3. The structure set forth in claim 2, and the pitch of said spirals being at least forty-five degrees sloped in opposite directions.

4. The structure set forth in claim 2 and said longitudinally projecting element being hydraulically actuated.

GEORGE L. GUSTAFSON.

REFERENCES CITED

The following references are of record in the file of this patent:

UNITED STATES PATENTS

| Number | Name | Date |
|---|---|---|
| 548,168 | Abrams | Oct. 22, 1895 |
| 1,177,609 | Edwards | Apr. 4, 1916 |
| 1,828,965 | Fuller et al. | Oct. 27, 1931 |
| 2,120,637 | Van Doorne | June 14, 1938 |
| 2,135,972 | Garlinger | Nov. 8, 1938 |
| 2,170,983 | Adams | Aug. 29, 1939 |
| 2,445,819 | Bell | July 27, 1948 |
| 2,459,731 | Wymore | Jan. 18, 1949 |